July 20, 1965 D. P. CHUBOFF 3,195,970
RECEPTACLE-SUPPORTING ASSEMBLY
Filed Aug. 1, 1962 3 Sheets-Sheet 1
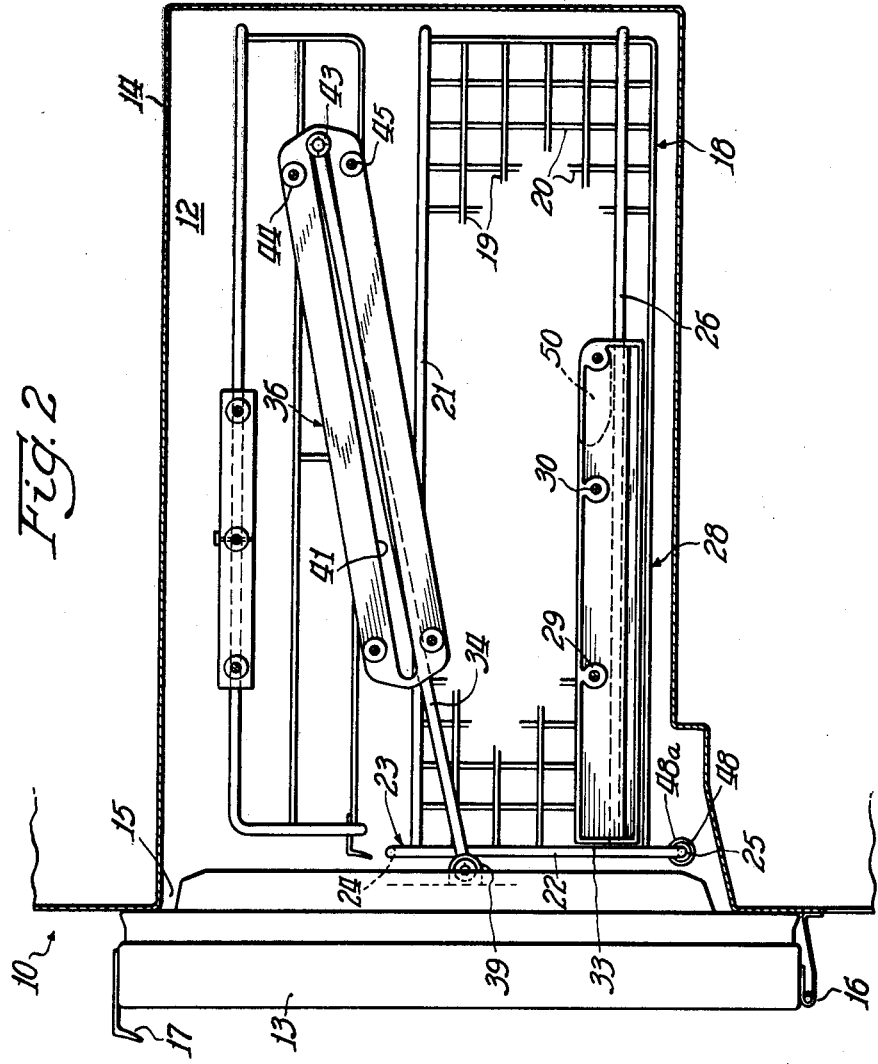
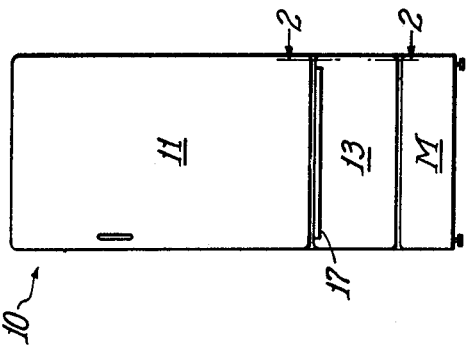
Inventor:
David P. Chuboff
By H. J. Schmid
Atty

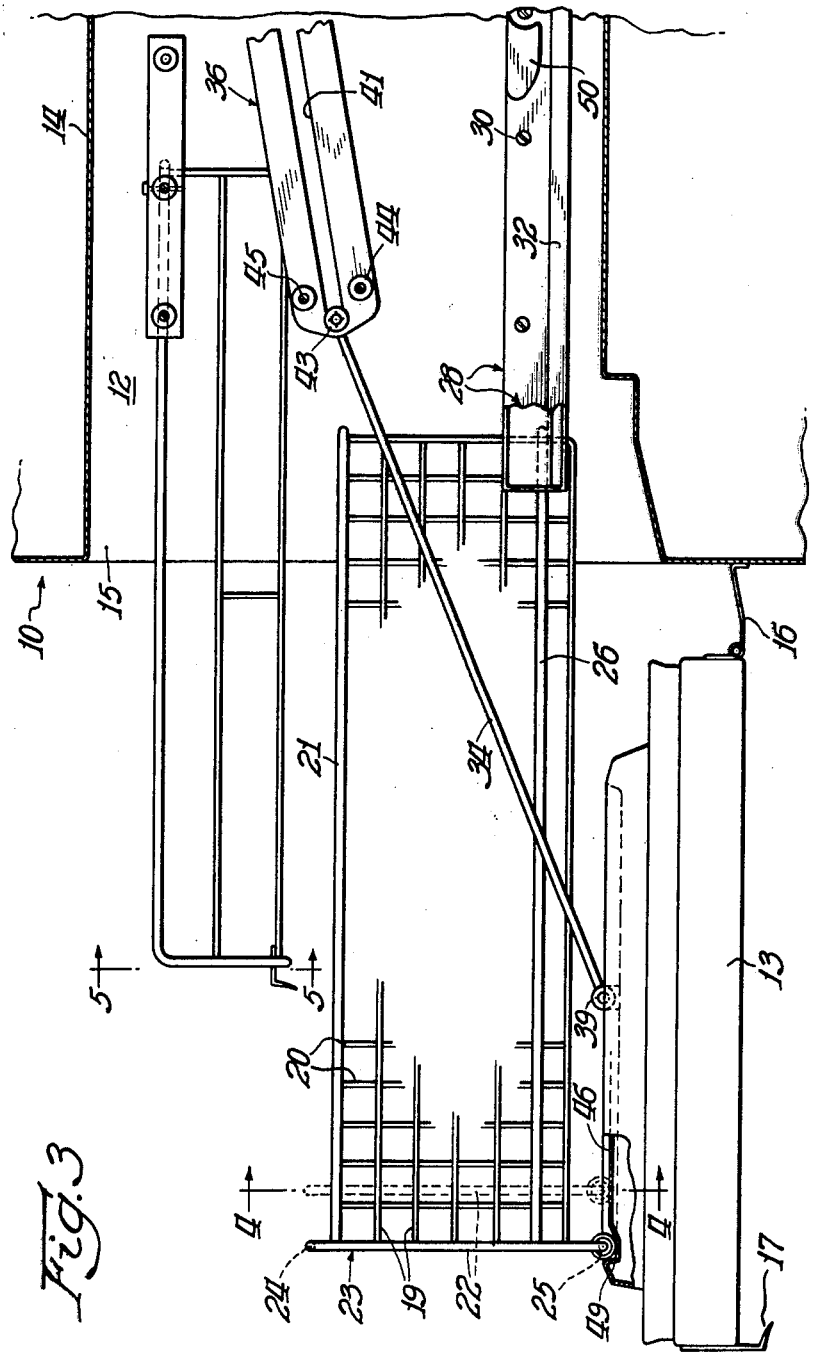

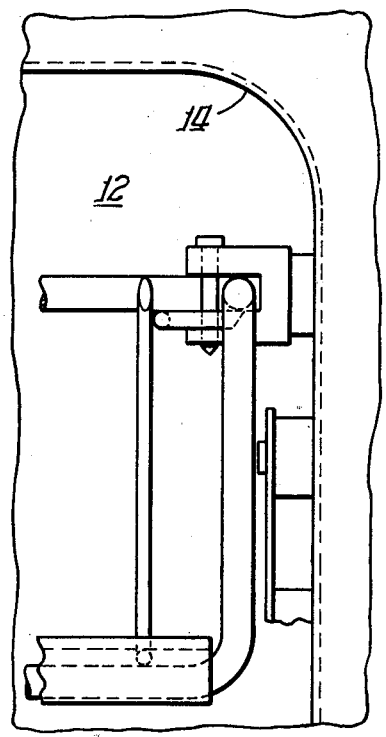
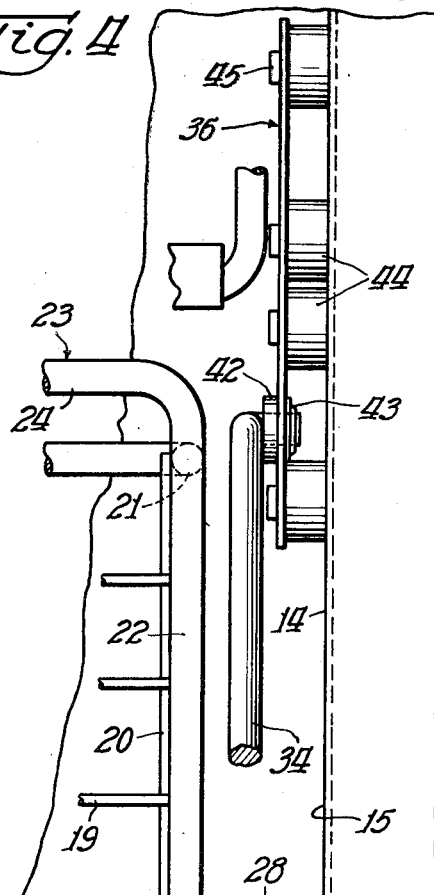
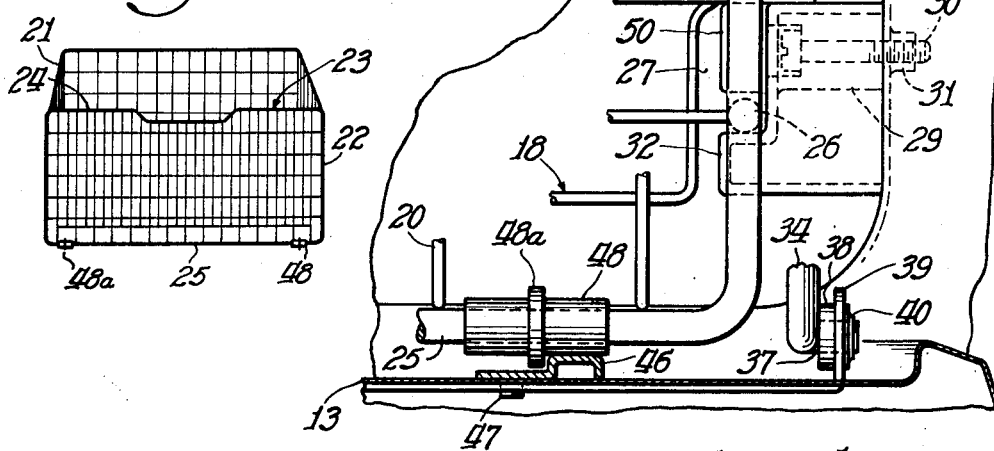

United States Patent Office 3,195,970
Patented July 20, 1965

3,195,970
RECEPTACLE-SUPPORTING ASSEMBLY
David P. Chuboff, Mount Prospect, Ill., assignor to Borg-Warner Corporation, Chicago, Ill., a corporation of Illinois
Filed Aug. 1, 1962, Ser. No. 213,993
3 Claims. (Cl. 312—311)

This invention relates to a receptacle-supporting assembly and more particularly to a receptacle-supporting assembly movably mounting the receptacle in a cabinet.

Conventional domestic refrigerators employ receptacles, such as baskets, for storing frozen foods in a compartment of the refrigerator. The receptacle may be slidably supported on the side walls of the compartment for movement relative to the compartment. Due to the desire to provide maximum space for frozen food storage, the receptacle is frequently of large size and the substantial weight of the frozen foods places considerable strain upon the receptacle supports in the compartment when the receptacle is withdrawn from the compartment because of the weight of the foods being localized in a small area of the supports.

In many cases, the receptacle compartment is located beneath an unfrozen food compartment of the refrigerator and it is necessary for a person to stoop to remove or place foods in the receptacle. In the disclosed embodiment of the invention, the receptacle may be disengaged from the cabinet and placed on a table or the like to permit the selection or placement of foods in the receptacle.

An object of the invention is to provide a receptacle-supporting assembly in a cabinet having support means for movement of the receptacle outwardly thereof and for cooperative support by door structure of the compartment.

Another object of the invention is to provide a receptacle-supporting assembly having the receptacle movably mounted on supports in a cabinet compartment and engageable with door structure of the compartment for additional support thereby during withdrawal of the receptacle from the compartment and in the access position of the receptacle.

A specific object of the invention is to provide a receptacle-supporting assembly in which the receptacle may be a wire basket provided with side rails slidably engaged with guides on the side walls of a cabinet compartment for movement into and from the compartment, the receptacle being cooperatively supported by a horizontally disposed open door of the compartment, in the outer access position of the receptacle, the receptacle being removable from the compartment and door to a location permitting the convenient selection or storage of food in the receptacle.

Other objects and advantages will become apparent from the following description taken in connection with the drawings in which:

FIG. 1 is a front elevation of the cabinet of a refrigerating apparatus embodying the receptacle-supporting assembly of my invention;

FIG. 2 is an enlarged fragmentary sectional view taken on line 2—2 of FIG. 1 showing a food receptacle movably supported within the frozen food compartment of a cabinet, the access door of the compartment being shown in closed position;

FIG. 3 is a view similar to FIG. 2 showing the compartment door in open position and providing support for the receptacle;

FIG. 4 is an enlarged fragmentary sectional view taken on line 4—4 of FIG. 3;

FIG. 5 is an enlarged fragmentary sectional view taken on line 5—5 of FIG. 3;

FIG. 6 is a perspective view of the receptacle.

Referring to the drawings, a combination refrigerator-freezer unit is shown in FIG. 1. and includes a cabinet 10 having a plurality of walls providing an upper unfrozen foods compartment having a front access opening enclosed by a door 11, a lower frozen foods compartment 12 having a front access opening enclosed by a door 13, and a bottom machine compartment generally indicated at M. The walls of the compartments are conventionally formed by a metal box-like liner and outer shells having suitable insulation material therebetween. The liner of the freezing compartment 12 is indicated at 14 and the front access opening 15 of the compartment is closed by the insulated door 13 pivotally supported at its bottom end by a hinge 16 for movement of the door by a handle 17 about the horizontal axis of the hinge from an upright vertical position, as shown in FIGS. 1 and 2, to a horizontal position shown in FIG. 3. Details of the refrigeration system have not been shown as it is well-known in the art the upper refrigerating compartment, for example, may be provided with a plate-like refrigerant evaporator, while the lower frozen food compartment 12 may employ another refrigerant evaporator in the form of a conduit coiled or wrapped around the liner of this compartment.

As the frozen food compartment is disposed in the lower portion of the cabinet, it is inconvenient for a person to gain access to the frozen food contents of the compartment as it requires the person to stoop or squat. To render the frozen foods readily accessible, there is provided a frozen food receptacle slidable into and out of the compartment.

More particularly, the receptacle is in the form of a wire-like rectangular basket generally indicated at 18 in compartment 12 and comprising a multiplicity of spaced parallel elongate horizontal wires 19 and spaced parallel vertical wires 20 forming the front, rear, side and bottom walls of the basket. The upper edge of the basket is formed of a U-shaped horizontal frame member 21 welded at its ends to two parallel spaced vertical bars 22 of a rectangular vertically disposed frame member 23 adjacent the upper horizontal bar 24 thereof, the lower horizontal bar 25 of the frame member 23 extending below the basket as shown for a purpose to be later described. The basket 18 further comprises a U-shaped horizontal bar member 26 engaging and connected to the rear wall of the basket and having its ends welded to the bars 22 of the frame member 23, the basket side walls being recessed at 27 (FIG. 4) so as to be in spaced relation to the parallel side bars 22 of the frame member 23.

The side bars 22 of the member 23 provide rails cooperating with horizontal brackets or guide supports generally identified at 28, for movement of the basket into and out of the frozen food compartment. As viewed in FIG. 4, each bracket is L-shaped in the end view thereof and extends longitudinally of the compartment. Each bracket is hollow and one side thereof has edge portions engaging the liner. A plurality of annular spacers 29 are positioned within the bracket and bolts 30 extend through the bracket, spacers and liner to secure the bracket to the liner by nuts 31, as shown in FIG. 4. The laterally extending foot portions 32 of the brackets provide supports for slidably engaging the bars or guide rails 26 of the basket. As seen in FIG. 2, the parallel side bars 22 of the basket frame member 23 contact the front ends of the brackets 28 at 33 to provide stops to limit inward movement of the basket into the compartment.

To provide additional support for the basket in its withdrawn position shown in FIG. 3 and also to limit door movement about the hinge 16 from its compartment-closing vertical position in FIG. 2 to is access horizontal position, opposite sides of the door are pivotally connected to links 34 having their upper ends received in guide members 36 secured to the side walls of the liner so that the door is maintained in the horizontal position shown in FIG. 3, the links cooperating with the hinge to support the basket as shown in FIG. 3. More particularly, the link 34 is pivotally connected to the door by its lower end being formed to provide a laterally extending stud 37 received within aligned openings in a spacer 38 and a bracket 39 rigidly mounted on the door and retained in engagement with the spacer and bracket by a keeper ring 40 received within a groove in the stud. The upper end of the link is offset, as shown in FIG. 4, for reception in the elongate slot 41 of guide member 36 to which it is slidably connected by an annular spacer 42 and keeper ring 43. A plurality of spacers 44 are disposed between the guide member 36 and the adjacent side of the liner, and nut and bolt assemblies 45 are provided to securely fasten the guide member to the liner. Accordingly, as the door is moved from its vertical closed position in FIG. 2 to its horizontal position in FIG. 3, the movement of the door will effect movement of the links from the positions shown in FIG. 2 to that of FIG. 3, the lower ends of the slotted guide members providing stops for limiting the downward movement of the door to its FIG. 3 position.

A further feature of the invention resides in the provision of a pair of spaced parallel tracks 46 secured on the door by screws 47 as shown in FIG. 4, the tracks cooperating with and engaging tubular guide members 48, which may be fixed or rolling, on the lower horizontal bar 25 of the front frame member 23 of the basket so that the members engage the tracks to guide basket movement on the door. Each guide member 48 is provided with an enlarged central portion or flanges 48a engageable with the side of the track for guiding the basket when the tubular guide member engages the track. To limit outward movement of the basket, the front end of each track (FIG. 3) is recessed to provide a stop shoulder 49 for engaging the guide members.

The brackets 28 are provided at the rear ends thereof with elongate guide portions 50 confining the basket bars 26 between these portions and the foot portions of the brackets so that the basket cannot tilt while in engagement with these portions 50 which are so disposed in such spaced relation to the door tracks that the basket guide members 48 contact the door tracks prior to the disengagement of the basket with the guide portions 50. This novel structure is of considerable importance in, not only preventing tilting of the basket during outward movement of the basket, but preventing strain by the usually heavily loaded basket on the brackets 28, supporting the receptacle, when the receptacle is withdrawn from the compartment of the refrigerator.

In the position of the basket shown in FIG. 3, the basket may be readily lifted from its engagement with the door and brackets 28 for movement to any desired table, or the like, for insertion or removal of foods from the basket. In replacing the basket in the frozen food compartment, the rails of the basket are positioned in the brackets 28 with the guide members 48 engaging the door tracks to permit movement of the basket into the compartment.

It will be apparent that my new and improved receptacle-supporting assembly is characterized by its unique structure of slidably supporting the receptacle in a cabinet compartment with the door of the compartment being provided with linkage effective to not only support the door in open position but also to provide ample support for the receptacle, while the door and basket are provided with cooperating guide means for permitting the ready insertion and withdrawal of the receptacle relative to the food storage compartment of the cabinet.

While the embodiment of the invention as herein disclosed constitutes its preferred form, it is to be understood that other forms might be adopted.

What is claimed is:

1. In combination, a cabinet having a compartment provided with a front access opening and having oppositely disposed side walls; a door hingedly mounted on said cabinet for movement from a vertical position normally closing the compartment front opening to a horizontal access position; a receptacle in said compartment and comprising a wire basket having side rails extending between and terminating at the front and rear ends of the basket and disposed in recessed portions in the sides of said basket adjacent to the bottom of the basket; a pair of L-shaped guide members secured to the compartment side walls, the laterally extending foot portions of said members extending within said basket recessed portions and engaging said rails for sliding horizontal movement of said basket relative to said compartment and to a position above said door in the horizontal position thereof; a rectangular vertical disposed frame member defining the front end of said basket and connected to the side rails, said frame member having its lower horizontal portion extending downwardly and disposed beneath the bottom wall of the basket and supporting said basket on said door during movement of said basket above said door, said frame member having its spaced vertical portions extending downwardly of said rails for engagement with the front ends of said guide members to limit inward movement of the basket into said compartment.

2. In the combination as defined in claim 1 wherein said frame member has its lower horizontal portion extending downwardly and disposed beneath the bottom wall of the basket; cylindrical guide members on said lower horizontal portion of said frame member; and tracks on said door and engageable with said guide members during movement of said basket above said door.

3. In the combination defined in claim 1 wherein the L-shaped guide members have rear end portions provided with parallel slots defined by projections extending over the basket rails and engageable with the rails only until said cylindrical guide members engage said door tracks during outward movement of the basket from the compartment to permit detachment of the basket from the cabinet when said basket is positioned on said door.

References Cited by the Examiner

UNITED STATES PATENTS

| | | | |
|---|---|---|---|
| 181,141 | 8/76 | Clous | 312—311 X |
| 508,932 | 11/93 | Gage | 312—311 X |
| 764,777 | 7/04 | Slater | 312—311 X |
| 1,091,393 | 3/14 | Schulde | 62—379 |
| 1,508,259 | 9/24 | Stafford | 312—348 X |
| 1,782,523 | 11/30 | Warren | 312—311 |
| 2,106,538 | 1/38 | Schmitt | 126—339 X |
| 2,200,319 | 5/40 | Zalkind | 312—261 |
| 2,215,881 | 9/40 | Levensten | 312—311 |
| 2,620,811 | 12/52 | Walker | 312—315 X |
| 2,657,697 | 11/53 | Walker | 312—311 X |
| 2,745,707 | 5/56 | Sebens | 312—311 |

FOREIGN PATENTS 212,858   1/61   Austria.

FRANK B. SHERRY, *Primary Examiner.*

CHANCELLOR E. HARRIS, *Examiner.*